(12) United States Patent
Arulraj et al.

(10) Patent No.: US 11,225,895 B2
(45) Date of Patent: Jan. 18, 2022

(54) CATALYST ARTICLE FOR USE IN AN EMISSION TREATMENT SYSTEM

(71) Applicant: JOHNSON MATTHEY PUBLIC LIMITED COMPANY, London (GB)

(72) Inventors: Kaneshalingam Arulraj, Royston (GB); Guy Richard Chandler, Royston (GB); Rainer Leppelt, Redwitz (DE); Andrew Newman, Royston (GB)

(73) Assignee: Johnson Matthey Public Limited Company, London (GB)

( * ) Notice: Subject to any disclaimer, the term of this patent is extended or adjusted under 35 U.S.C. 154(b) by 110 days.

(21) Appl. No.: 16/361,450

(22) Filed: Mar. 22, 2019

(65) Prior Publication Data
US 2019/0301334 A1    Oct. 3, 2019

(30) Foreign Application Priority Data

Mar. 29, 2018  (GB) ..................... 1805312

(51) Int. Cl.
*B01J 21/04* (2006.01)
*B01J 21/06* (2006.01)
(Continued)

(52) U.S. Cl.
CPC ....... *F01N 3/2807* (2013.01); *B01D 53/9418* (2013.01); *B01D 53/9436* (2013.01);
(Continued)

(58) Field of Classification Search
CPC . B01J 21/04; B01J 21/06; B01J 21/063; B01J 21/066; B01J 21/08; B01J 21/12;
(Continued)

(56) References Cited

U.S. PATENT DOCUMENTS 9,227,176 B2 *  1/2016  Andersen ................. B01J 23/44
9,545,602 B2 *  1/2017  Sonntag ............. B01D 53/8628
(Continued)

FOREIGN PATENT DOCUMENTS

GB  2541500 A  2/2017
GB  2561083    5/2018
(Continued)

*Primary Examiner* — Cam N. Nguyen (57) ABSTRACT

A catalyst article for treating a flow of a combustion exhaust gas comprises: a catalytically active substrate comprising one or more channels extending along an axial length thereof through which, in use, a combustion exhaust gas flows, the one or more channels having a first surface for contacting a flow of combustion exhaust gas; wherein the substrate is formed of an extruded vanadium-containing SCR catalyst material, wherein a first layer is disposed on at least a portion of the first surface, wherein the first layer comprises a washcoat of an ammonia slip catalyst composition comprising one or more platinum group metals supported on a particulate metal oxide support material, and wherein a layer comprising a washcoat of SCR catalyst composition is disposed on a surface in the one or more channels, wherein at least the portion of the first surface on which the first layer is disposed comprises a compound of copper, iron, cerium or zirconium or a mixture of any two or more thereof.

21 Claims, 5 Drawing Sheets

(51) Int. Cl.

| | | |
|---|---|---|
| B01J 21/08 | (2006.01) | |
| B01J 21/12 | (2006.01) | |
| B01J 23/10 | (2006.01) | |
| B01J 23/22 | (2006.01) | |
| B01J 23/40 | (2006.01) | |
| B01J 23/42 | (2006.01) | |
| B01J 23/44 | (2006.01) | |
| B01J 23/56 | (2006.01) | |
| B01J 23/64 | (2006.01) | |
| B01J 23/72 | (2006.01) | |
| B01J 23/745 | (2006.01) | |
| B01J 23/89 | (2006.01) | |
| B01J 29/46 | (2006.01) | |
| B01J 29/76 | (2006.01) | |
| B01J 35/00 | (2006.01) | |
| B01J 35/04 | (2006.01) | |
| B01J 37/00 | (2006.01) | |
| B01J 37/02 | (2006.01) | |
| B01J 37/03 | (2006.01) | |
| B01J 37/08 | (2006.01) | |
| F01N 3/035 | (2006.01) | |
| F01N 3/10 | (2006.01) | |
| F01N 3/20 | (2006.01) | |
| F01N 3/28 | (2006.01) | |
| B01D 53/94 | (2006.01) | |

(52) U.S. Cl.
CPC .......... *B01D 53/9468* (2013.01); *B01J 23/42* (2013.01); *B01J 29/46* (2013.01); *B01J 29/763* (2013.01); *B01J 35/0006* (2013.01); *B01J 35/04* (2013.01); *B01J 37/0009* (2013.01); *B01J 37/0018* (2013.01); *B01J 37/0201* (2013.01); *B01J 37/0217* (2013.01); *B01J 37/0236* (2013.01); *B01J 37/0244* (2013.01); *B01J 37/038* (2013.01); *B01J 37/088* (2013.01); *F01N 3/035* (2013.01); *F01N 3/105* (2013.01); *F01N 3/2066* (2013.01); *F01N 3/2828* (2013.01); *B01D 53/9472* (2013.01); *B01D 2255/1021* (2013.01); *B01D 2255/1023* (2013.01); *B01D 2255/20723* (2013.01); *B01D 2255/20738* (2013.01); *B01D 2255/20761* (2013.01); *B01D 2255/50* (2013.01); *B01D 2255/9022* (2013.01); *B01D 2255/911* (2013.01); *B01D 2258/012* (2013.01); *B01J 23/22* (2013.01); *B01J 37/0225* (2013.01); *B01J 2219/2428* (2013.01); *B01J 2229/186* (2013.01); *B01J 2229/20* (2013.01); *B01J 2229/42* (2013.01); *B01J 2523/00* (2013.01); *F01N 2330/04* (2013.01); *F01N 2330/60* (2013.01); *F01N 2370/04* (2013.01); *F01N 2510/06* (2013.01); *F01N 2510/0682* (2013.01); *F01N 2510/0684* (2013.01)

(58) Field of Classification Search
CPC ... B01J 23/10; B01J 23/22; B01J 23/40; B01J 23/42; B01J 23/44; B01J 23/56; B01J 23/6482; B01J 23/72; B01J 23/745; B01J 23/8906; B01J 23/892; B01J 23/8926; B01J 23/898; B01J 29/46; B01J 29/763; B01J 35/0006; B01J 35/04; B01J 37/0009; B01J 37/0018; B01J 37/0201; B01J 37/0217; B01J 37/0236; B01J 37/0244; B01J 17/038; B01J 17/088; F01N 3/035; F01N 3/105; F01N 3/2066; F01N 3/2807; F01N 3/2828; B01D 53/9418; B01D 53/9436; B01D 53/9468
USPC .................. 502/60, 258–262, 304, 332–339, 502/349–351, 415, 439, 527.12, 527.13, 502/527.19
See application file for complete search history.

(56) References Cited

U.S. PATENT DOCUMENTS

| | | | | |
|---|---|---|---|---|
| 9,579,603 | B2* | 2/2017 | Sonntag | B01J 29/072 |
| 9,579,638 | B2* | 2/2017 | Fedeyko | B01J 37/0244 |
| 9,597,636 | B2* | 3/2017 | Sonntag | F01N 3/0842 |
| 9,649,596 | B2* | 5/2017 | Chang | B01J 37/0246 |
| 9,751,080 | B2* | 9/2017 | Fedeyko | B01J 29/85 |
| 9,757,718 | B2* | 9/2017 | Fedeyko | B01J 35/0006 |
| 9,789,441 | B2* | 10/2017 | Larsson | B01J 29/763 |
| 9,849,421 | B2* | 12/2017 | Chandler | B01J 23/83 |
| 9,878,287 | B2* | 1/2018 | Lu | B01D 53/9431 |
| 9,937,489 | B2* | 4/2018 | Larsson | F01N 3/2828 |
| 9,993,772 | B2* | 6/2018 | Gilbert | F01N 3/106 |
| 9,999,876 | B2* | 6/2018 | Blakeman | B01J 23/44 |
| 10,105,692 | B2* | 10/2018 | Andersen | B01J 23/42 |
| 10,173,173 | B2* | 1/2019 | Andersen | B01J 35/04 |
| 10,179,329 | B2* | 1/2019 | Phillips | B01D 53/9422 |
| 10,188,987 | B2* | 1/2019 | Li | B01D 53/9472 |
| 10,201,807 | B2* | 2/2019 | Larsson | B01J 23/42 |
| 10,322,372 | B2* | 6/2019 | Chen | B01J 23/42 |
| 10,369,555 | B2* | 8/2019 | Burgess | F01N 3/2066 |
| 10,500,571 | B2* | 12/2019 | Greenham | B01D 53/9468 |
| 10,500,574 | B2* | 12/2019 | Fedeyko | B01J 29/7807 |
| 10,589,261 | B2* | 3/2020 | Larsson | F01N 3/106 |
| 10,799,832 | B2* | 10/2020 | Howells | B01J 29/78 |
| 10,807,081 | B2* | 10/2020 | Larsson | B01J 35/0006 |
| 10,828,603 | B2* | 11/2020 | Chen | B01D 53/9468 |
| 2014/0212350 | A1* | 7/2014 | Andersen | B01J 23/6527 423/237 |
| 2015/0037233 | A1* | 2/2015 | Fedeyko | B01J 35/04 423/239.1 |
| 2015/0352492 | A1* | 12/2015 | Andersen | B01J 23/10 423/237 |
| 2016/0045868 | A1 | 2/2016 | Sonntag | |
| 2016/0367938 | A1 | 12/2016 | Larsson | |
| 2016/0367973 | A1* | 12/2016 | Larsson | B01D 53/9418 |
| 2018/0045097 | A1* | 2/2018 | Tang | B01J 29/072 |
| 2018/0078926 | A1* | 3/2018 | Chen | B01D 53/944 |
| 2018/0111086 | A1* | 4/2018 | Chen | F01N 3/2066 |
| 2018/0221860 | A1* | 8/2018 | Larsson | F01N 3/2066 |
| 2018/0264446 | A1* | 9/2018 | Burgess | F01N 3/2066 |
| 2018/0280876 | A1* | 10/2018 | Chen | F01N 3/035 |
| 2018/0280877 | A1* | 10/2018 | Chen | B01J 35/04 |
| 2018/0280937 | A1* | 10/2018 | Bauer | B01J 37/08 |
| 2018/0283250 | A1* | 10/2018 | Chen | B01J 23/42 |
| 2019/0001268 | A1* | 1/2019 | Chen | B01D 53/9418 |
| 2019/0091677 | A1* | 3/2019 | Bauer | B01J 23/22 |
| 2019/0168198 | A1* | 6/2019 | Larsson | B01J 23/42 |
| 2019/0176128 | A1* | 6/2019 | Micallef | B01J 37/0244 |
| 2019/0283011 | A1* | 9/2019 | Chen | B01D 53/9468 |
| 2019/0299160 | A1* | 10/2019 | Chen | B01J 23/42 |

FOREIGN PATENT DOCUMENTS

| | | |
|---|---|---|
| WO | 9947260 A1 | 9/1999 |
| WO | 2009093071 | 7/2009 |
| WO | 2011092521 A1 | 8/2011 |
| WO | 2013017873 A1 | 2/2013 |
| WO | 2014027207 A1 | 2/2014 |
| WO | 2016205506 A1 | 12/2016 |
| WO | 2016205509 A1 | 12/2016 |
| WO | 2018010804 A1 | 1/2018 |
| WO | 2018178627 A1 | 10/2018 |

* cited by examiner

CATALYST ARTICLE FOR USE IN AN EMISSION TREATMENT SYSTEM

CROSS-REFERENCE TO RELATED APPLICATIONS

This application claims priority benefit to Great Britain Patent Application No. 1805312.4, filed on Mar. 29, 2018, which is incorporated herein by reference.

The present invention relates to an improved catalyst article for use in an emission treatment system. In particular, it relates to an ammonia slip catalyst formulation provided on an extruded vanadium-containing SCR catalyst with an improved tolerance of vanadium poisoning.

Hydrocarbon combustion in diesel engines, stationary gas turbines, and other systems generates exhaust gas that must be treated to remove nitrogen oxides ($NO_x$), which comprises NO (nitric oxide) and $NO_2$ (nitrogen dioxide), with NO being the majority of the $NO_x$ formed. $NO_x$ is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Exhaust gas generated in lean-burn gasoline, liquid petroleum gas or natural gas and diesel engines is generally oxidative. $NO_x$ needs to be reduced selectively with a catalyst and a reductant in a process known as selective catalytic reduction (SCR) that converts $NO_x$ into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalysed substrate.

In order to maximize the conversion of $NO_x$, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore, the release of ammonia in exhaust gas should be eliminated. In many conventional exhaust systems, an ammonia oxidation (AMOX) catalyst (also known as an ammonia slip catalyst or "ASC") is installed downstream of the SCR catalyst to remove ammonia from the exhaust gas by converting it to nitrogen. The use of ammonia slip catalysts can allow for net $NO_x$ conversions of greater than 90% over a typical diesel driving cycle.

Catalysts for oxidizing excess ammonia in an exhaust gas are known. WO 2016/205506 describes an example of an ammonia slip catalyst. This disclosure includes examples of selective ASC coatings comprising Pt on Alumina provided on extruded vanadium-containing catalysts. The coatings are said to have good resistance to vanadium poisoning. A further example of an ammonia slip catalyst is disclosed in Applicant's WO 2016/205509, which describes catalysts comprising a blend of platinum on a support with low ammonia storage with a SCR catalyst.

Applicant's United Kingdom patent application no. 1705158.2 filed on 30 Mar. 2017 discloses a catalyst article comprising a catalytically active substrate comprising one or more channels extending along an axial length thereof through which, in use, a combustion exhaust gas flows, the one or more channels having a first surface for contacting a flow of combustion exhaust gas; wherein the substrate is formed of an extruded vanadium-containing SCR catalyst material, wherein a first layer is provided on at least a portion of said first surface, wherein the first layer comprises an ammonia slip catalyst composition comprising one or more platinum group metals (PGMs) supported on titania, a silica-titania mixed oxide, a Ce—Zr mixed oxide, or a mixture thereof, and a second layer is provided on at least a portion of the first layer and comprises an SCR catalyst composition. The coatings are said to have good resistance to vanadium poisoning.

Applicant's inventors have now found that, very surprisingly, in-use vanadium poisoning of an oxidation catalyst layer disposed directly on a catalytically active substrate formed of an extruded vanadium-containing SCR catalyst material can be reduced or avoided by including an iron compound to at least a region of the catalytically active substrate in contact with the oxidation catalyst layer. The iron compound can be added by impregnating the region, e.g. with an aqueous solution of an iron salt; or by adding an iron compound to the extrusion paste also containing the vanadium-containing SCR catalyst material. Such iron compound is in addition to any cationic iron present in any extruded iron-promoted zeolite SCR catalyst component, e.g. ion-exchanged zeolite, present in the extruded vanadium-containing SCR catalyst material, such as those described in Applicant's WO 2014/027207 A1.

Furthermore, it has also been found that, very surprisingly, the physical strength of a catalytically active substrate formed of extruded vanadium-containing SCR catalyst material is improved when an iron compound is added to the extrusion paste also containing the vanadium-containing SCR catalyst material. It is believed that this improvement in strength advantage is also obtained when, e.g. an extruded vanadium-containing SCR catalyst material is impregnated with the aqueous solution of an iron salt and the resulting impregnated substrate is calcined.

According to a first aspect there is provided a catalyst article for treating a flow of a combustion exhaust gas, the article comprising: a catalytically active substrate comprising one or more channels extending along an axial length thereof through which, in use, a combustion exhaust gas flows, the one or more channels having a first surface for contacting a flow of combustion exhaust gas; wherein the substrate is formed of an extruded vanadium-containing SCR catalyst material, wherein a first layer is disposed on at least a portion of the first surface, wherein the first layer comprises a washcoat of an ammonia slip catalyst composition comprising one or more platinum group metals supported on a particulate metal oxide support material, and wherein a layer comprising a washcoat of SCR catalyst composition is disposed on a surface in the one or more channels, wherein at least the portion of the first surface on which the first layer is disposed comprises a compound of copper, iron, cerium or zirconium or a mixture of any two or more thereof.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

Furthermore, the term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

In use, the extruded vanadium-containing SCR catalyst material in the presence of a nitrogenous reductant acts to reduce $NO_x$ in an exhaust gas. Any excess nitrogenous reductant contacts the ASC in the first layer and is converted into nitrogen. The presence of the layer comprising a washcoat of (a further) SCR catalyst composition addresses the issue of $NO_x$ being generated by over oxidation of the ammonia, the emission of which NOx can reduce the net conversion of NOx across the system as a whole. As a result of this configuration the $NO_x$ conversion levels are high.

However, the inventors have found that vanadium can migrate from the substrate into the PGM layer of the ASC coating. This has resulted in deactivation, especially after 580° C./100 hours of engine ageing corresponding to a vehicle end-of-life simulation, and was observed where the PGM support was based on zeolite. Surprisingly, where the extruded vanadium-containing SCR catalyst material is impregnated with an aqueous iron nitrate solution, it has now been found to allow the ASC functionality to become much more stable and provides an improved poison tolerance, particularly with respect to vanadium, for ammonia slip catalysts (ASCs) coated on extruded vanadium-containing catalyst substrates. This has been demonstrated in particular in comparison to extruded vanadium-containing SCR catalyst material that has not been first impregnated with an aqueous iron nitrate solution.

Furthermore, an inventor discovered during research that cores coated with iron nitrate, cerium nitrate, zirconium nitrate or copper nitrate cut from extruded honeycombs containing vanadium-containing SCR catalyst material then calcined leached less vanadium than uncoated cores in standard volumes of distilled water in which the cores were immersed for a period of the test. The eluent was tested using inductively couple plasma (ICP) to determine the quantity of vanadium present therein. This suggested that—in addition to iron—cerium compounds, zirconium compounds and copper compounds, or mixtures of any two or more of iron compounds, cerium compounds, zirconium compounds and copper compounds, could also be used to reduce or avoid vanadium poisoning of the oxidation activity of PGMs in the first layer. It is known that a combination of cerium- and iron-compounds can provide synergistic SCR activity and so the particular combination of cerium- and iron-compounds is preferred.

Additionally, iron and copper compounds have relatively low oxidation activity—relative to PGMs. However, the use of iron and/or copper could assist with the oxidation functionality in the first layer so that less PGMs might be needed to obtain a desired oxidation activity.

Preferably, the compound comprises a compound of iron or consists of a compound of iron.

Without wishing to be bound by theory, it is considered that the vanadium and the iron and the PGMs associate with different sites in the support material so that the vanadium does not interfere with the catalytic properties of the PGM.

The inventors also consider that compound of iron, copper, cerium or zirconium, which may be present following calcination in air as an oxide compound, although in use may also be present as a nitrate or carbonate, can also be defined as free-iron, free-copper, free-cerium or free-zirconium. In particular, the term "free" in this context is intended to distinguish iron or copper ion-exchanged zeolites present in the substrate and co-extruded with the vanadium-containing SCR catalyst material (see e.g. WO 2014/027207 A1), where the ion exchanged copper is present as a cation or else in relatively low quantities of free compound as an artefact in the ion exchange of the iron or copper, i.e. any iron or copper that remained in the zeolite following ion exchange which became oxidised during calcination. In this regard, the "free" iron- and/or copper-compound present in the catalyst article according to the invention is present at significantly higher quantities than the de minimis quantities remaining in a zeolite following ion exchange. In particular, the total one or more of iron compound, cerium compound, copper compound or zirconium compound can be present in quantities of $>200$ gft$^{-3}$, such as $>500$ gft$^{-3}$, or $>750$ gft$^{-3}$ or $>1000$ gft$^{-3}$.

The present invention relates to a catalyst article. By catalyst article it is meant a structure as described herein having catalytic properties. The catalytic properties derive from materials included in the structure or coated thereon. The article as defined herein includes both a coated catalytic substrate as described herein and also a processed and canned SCR and/or ASC unit suitable for installation on an automobile. The catalyst article provides a heterogeneous oxidation catalyst that is effective at reducing ammonia slip when used for an SCR process or downstream of an SCR process.

The catalyst article is for treating a flow of a combustion exhaust gas. That is, the catalyst article can be used to treat an exhaust gas derived from a combustion process, such as from an internal combustion engine (whether mobile or stationary), a gas turbine for stationary, marine, or locomotive applications, and coal or oil-fired power plants. Preferred applications for the catalyst article of the present invention is in an exhaust system for an automotive vehicle. The article may also be used to treat gas from industrial processes such as refining, from refinery heaters and boilers, furnaces, the chemical processing industry, coke ovens, municipal waste plants and incinerators, etc. In a particularly preferred embodiment, the method is used for treating exhaust gas from a gas turbine or a lean-burn gasoline, diesel, liquid petroleum gas or natural gas engine.

The layer comprising a washcoat of SCR catalyst composition disposed on a surface in the one or more channels can comprise the first layer disposed on at least a portion of the first surface, i.e. wherein the first layer is a mixture of the SCR catalyst composition and ammonia slip catalyst composition. Alternatively, this layer is a second layer, which is disposed on at least a portion of the first layer.

The catalyst article comprises a catalytically active substrate comprising one or more channels extending along an axial length thereof through which, in use, a combustion exhaust gas flows. Such configurations are sometimes referred to in the art as being "honeycomb" form. In use, the one or more channels have a first surface for contacting a flow of combustion exhaust gas. The catalytically active substrate provides an SCR functionality so that the $NO_x$ in the combustion gas is converted into nitrogen and water.

The substrate is formed of an extruded vanadium-containing SCR catalyst material. Examples of such extruded vanadium-containing substrates are provided in WO 2011/092521, WO 2009/093071 and WO 2013/017873, the contents of which are included herein by reference. The use of such a vanadium-containing substrate provides effective SCR properties but provides a risk of vanadium poisoning. Preferably the substrate comprises from 1 to 3 wt %, preferably 1.5 to 2.5 wt %, vanadium oxide. Such levels are suitable for good SCR properties.

The extruded SCR catalyst material preferably further comprises a transition metal-promoted molecular sieve. For example, a preferred substrate is formed of a blend of vanadium/tungsten/titania and an iron-promoted ZSM-5 zeolite as disclosed in WO 2014/027207 A1, the entire contents of which are incorporated herein by reference. Other suitable transition metals and molecular sieves are well known in the art discussed herein.

Preferably the substrate is a honeycomb flow-through monolith substrate. Honeycomb configurations are more compact than plate types, but have higher pressure drops and plug (become blocked) more easily. For most mobile applications, the preferred substrates include flow-through monoliths having a so-called honeycomb geometry that comprise multiple adjacent, parallel channels that are open on both ends and generally extend from the inlet face to the outlet face of the substrate and result in a high-surface area-to-volume ratio. For some applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. Alternatively, the substrate can be the channels of a so-called wall-flow filter.

A first layer is provided on at least a portion of inside walls of the substrate channels, i.e. the "first surface". According to one embodiment the first layer covers up to 50% of the axial length of the substrate, preferably from 10 to 40% of the axial length and preferably extends from an end of the article. In this embodiment, the remaining uncovered substrate acts as an SCR catalyst to treat $NO_x$ in the presence of a nitrogenous reductant. The coated portion provided by the first layer then acts as an ASC. Preferably the coated portion extends from the downstream end of the substrate in use, such that the ASC acts on any residual ammonia (or the like) before it leaves the substrate.

According to an alternative embodiment the first layer covers at least 50% of the axial length of the substrate, preferably 100% of the axial length. In this embodiment, the function of the device may be entirely as an ASC, with the ASC properties provided by the first layer, and this may be located downstream of a separate SCR catalyst in the emission treatment system.

The first layer comprises an ammonia slip catalyst composition. The ammonia slip catalyst composition comprises one or more platinum group metals (PGM) supported on a particulate metal oxide support material selected from the group consisting of alumina, a silica-titania mixed oxide, a Ce—Zr mixed oxide, ceria, titania, silica, zirconia and a zeolite or mixtures of any two or more thereof. The PGM is selected from ruthenium, rhodium, palladium, osmium, iridium, platinum and mixtures of two or more thereof. Preferably the PGM is platinum, palladium, or a combination of the two, and most preferably consists of platinum. Preferably the first layer comprises from 0.05 to 0.5 wt % of the platinum group metal, more preferably from 0.1 to 0.2 wt %. Such PGM loadings provide desirable ASC properties. Below the lower limit the durability of the ASC coating is reduced due to sintering of the PGM on heating. Above the upper limit the selectivity of the catalyst is reduced.

Where the particulate metal oxide support material is a zeolite, preferably it is a siliceous zeolite having a silica-to-alumina ratio of at least one of at least 100, such as at least 200, at least 250, at least 300, at least 400, at least 500, at least 750 or at least 1000 as described in one or both of Applicant's WO 2016/205506 A1 or WO 2016/205509 A1.

The titania, where present in the first layer is preferably anatase because it has a higher surface area. The silica-titania mixed oxide, where present, may be characterised by a silica to titania balance. Preferably, the silica-titania mixed oxide contains less than 50 wt % silica, preferably from 5 to 25 wt % and more preferably from 7 to 15 wt % silica. The Ce—Zr mixed oxide, where present may be characterised by a ceria to zirconia balance. Preferably, the Ce—Zr mixed oxide has a ratio of ceria to zirconia of 60:40 to 30:70 based on the total oxide, i.e. $CeO_2:ZrO_2$.

In addition to the PGM on the listed supports, the first layer may comprise additional components. For example, components such as fillers, binders, stabilizers, rheology modifiers, and other additives. In certain embodiments, the washcoat comprises pore-forming agents such as graphite, cellulose, starch, polyacrylate, and polyethylene, and the like. These additional components do not necessarily catalyse the desired reaction, but instead improve the catalytic material's effectiveness, for example by increasing its operating temperature range, increasing contact surface area of the catalyst, increasing adherence of the catalyst to a substrate and the like. Typically, the only additional component will be a binder. Typically, metal oxide particles used as binders are distinguishable over metal oxide particles used as supports based on particle size, with the binder particles being significantly larger relative to support particles. Preferably the additional components form less than 25 wt %, preferably less than 15 wt %, and most preferably less than 10 wt % of the first layer with the balance PGM and titania, a silica-titania mixed oxide, a Ce—Zr mixed oxide, or a mixture thereof.

Preferably the first layer comprises less than about 5 wt % and more preferably less than about 1 wt % of vanadium when fresh after an initial calcining to fix the layers.

As explained hereinabove, the second layer can be provided over the first layer, which second layer comprises an SCR catalyst composition. The second layer contains a catalyst for storing $NH_3$ and selectively reducing NOx with $NH_3$ in the presence of oxygen, also referred to herein as an SCR catalyst. Preferably, the second layer covers the entirety of the first layer within the channels. Indeed, most preferably the second layer encompasses the first layer such that none of the first layer is able to directly contact the flow of exhaust gases. This configuration provides for improved selectivity to $N_2$ and to have a minimised $N_2O$ and NO and/or $NO_2$ generation. Incomplete coverage or elimination of SCR top layer altogether may increase $NH_3$ conversion at the expense of selectivity (more $N_2O$ and NO and/or $NO_2$ generation over the ASC). A top layer with little or no usable $NH_3$ storage may result in poorer selectivity more $N_2O$ and NO and/or $NO_2$ generation.

Preferably the SCR catalyst composition of the layer comprising a washcoat of SCR catalyst composition disposed on a surface in the one or more channels comprises a copper-promoted zeolite, an iron-promoted zeolite or a combination thereof. The first SCR catalyst is preferably a Cu-SCR catalyst, an Fe-SCR catalyst or a mixed oxide, more preferably a Cu-SCR catalyst or an Fe-SCR catalyst, most preferably a Cu-SCR catalyst. The Cu-SCR catalyst comprises copper and a zeolite. The Fe-SCR catalyst comprises iron and a zeolite.

A zeolite is a microporous aluminosilicate having any one of the framework structures listed in the Database of Zeolite Structures published by the International Zeolite Association (LZA). The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Zeolites can be categorised by pore size, e.g. a maximum number of tetrahedral atoms present in a zeolite's framework. As defined herein, a small pore zeolite, such as CHA, contains a maximum ring size of eight tetrahedral atoms, whereas a medium pore zeolite, e.g. MFI, contains a maximum ring size of ten tetrahedral atoms and a large pore zeolite, such as BEA, contains a maximum ring size of twelve tetrahedral atoms. Meso pore zeolites are also known, but they have a maximum ring size of greater than twelve tetrahedral atoms. Most preferred zeolite frameworks for the SCR catalyst compositions for use in layers of the present invention are the small pore zeolites, particularly those having the framework type AEI, AFX, CHA, DDR, EM, ITE, LEV, LTA, STI or SFW, or which CHA or AEI are particularly preferred.

Aluminosilicate zeolites can have a silica/alumina molar ratio (SAR) defined as $SiO_2/Al_2O_3$) from at least about 5, preferably at least about 20, with useful ranges of from about 10 to 200. Most preferably, the aluminosilicate SAR range is 10 to 30, which provides a balance between activity, i.e. the ability to ion-exchange to anionic sites provided by alumina, and thermal durability provided by the silica content.

Preferably the second layer has at least some ammonia storage capacity of up to 0.1 g per g of the second layer when measured at 200° C., preferably from 0.01 to 0.05 g/g and most preferably about 0.025 g/g.

As used herein the terms "first layer" and "second layer" are used to describe the relative positions of catalyst layers in the catalyst article with respect to the normal direction of exhaust gas flow through and/or over the catalyst article. Under normal exhaust gas flow conditions, exhaust gas contacts the second layer prior to contacting the first layer and will then contact the second layer again before leaving the catalyst article. It is noted that the first and second layers are porous by virtue of their structure and permit the exhaust gases to pass within and through the layer material. The first layer is applied to a flow-through honeycomb substrate as a bottom layer and the second layer is top layer that is applied over the first layer.

Techniques for applying the first and second layers and the impregnation medium for the copper, iron, cerium or zirconium compound are well known in the art and include the application of a washcoat to the surfaces to be coated, see e.g. Applicant's WO 99/047260 A1. After coating the layers onto the article they are typically dried and then calcined to fix the layers. Calcining is well known in the art and may be carried out in air at temperatures of about 500° C.

Preferably the catalyst article described herein is canned and ready for use in an automobile exhaust gas treatment system.

According to a further aspect there is provided an emission treatment system for treating a flow of a combustion exhaust gas, the system comprising a source of combustion exhaust gas in fluid communication with the catalyst article described herein, and a source of nitrogenous reductant arranged upstream of said article. Preferably the source of combustion exhaust gas is a diesel engine.

That is, the catalyst article of the present invention may be part an emission gas treatment system wherein the catalyst article is disposed downstream of a source of a nitrogenous reductant. According to one embodiment the article is an SCR catalyst comprising a downstream ASC catalyst portion. For example, the ammonia slip catalyst is disposed on the downstream end of a flow-through substrate and an SCR catalyst is disposed on the upstream end of the flow-through substrate. According to another embodiment the article is an ASC catalyst to be provided downstream of a separate selective catalytic reduction (SCR) catalyst. That is, the ammonia slip catalyst and SCR catalyst are disposed on separate bricks within the exhaust system. These separate bricks can be adjacent to, and in contact with, each other or separated by a specific distance, provided that they are in fluid communication with each other and provided that the SCR catalyst brick is disposed upstream of the ammonia slip catalyst brick. In both of these embodiments, the ammonia slip catalyst oxidizes at least a portion of any nitrogenous reductant that is not consumed by the selective catalytic reduction process.

The nitrogenous reductant can be ammonia per se, hydrazine or an ammonia precursor selected from the group consisting of urea ($(NH_2)_2CO$), ammonium carbonate, ammonium carbamate, ammonium hydrogen carbonate and ammonium formate. Ammonia is most preferred.

Preferably the first layer covers up to 50% of the axial length of the substrate and is provided extending from a downstream end of the article, in use.

According to a further aspect there is provided a method for treating a flow of a combustion exhaust gas, the method comprising contacting a flow of combustion exhaust gas with the catalyst article described herein in the presence of a nitrogenous reductant.

According to a further aspect, there is provided a method of making a catalyst article according to the catalyst article of the present invention, which method comprising impregnating a first surface of one or more channels of a catalytically active substrate formed of an extruded vanadium-containing SCR catalyst material on which a first layer comprising a washcoat of an ammonia slip catalyst composition comprising one or more platinum group metals supported on a particulate metal oxide support material is to be disposed with an aqueous salt solution of copper, iron, cerium, magnesium or zirconium or a mixture of any two or more thereof, drying the impregnated substrate and applying a washcoat of an ammonia slip catalyst composition comprising one or more platinum group metals supported on a particulate metal oxide support material on the first surface.

According to a further aspect, there is provided a method of making a catalyst article according to the catalyst article of the present invention, which method comprising forming an extrudeable paste comprising a vanadium-containing SCR catalyst material, a permanent binder and a compound of copper, iron, cerium, magnesium or zirconium or a mixture of any two or more thereof, extruding the paste into a honeycomb form comprising one or more channels extending along an axial length thereof through which, in use, a combustion exhaust gas flows, the one or more channels having a first surface for contacting a flow of combustion exhaust gas, drying and calcining the extruded honeycomb form paste and applying a washcoat of an ammonia slip catalyst composition comprising one or more platinum group metals supported on a particulate metal oxide support material on the first surface.

Although the present disclosure describes first and second layers, it is also contemplated that the first and second layers may be provided as a single mixed layer comprising all of those components described herein for the first and second layers.

The present disclosure will now be described in relation to the following non-limiting figure, in which.

Figure 1:
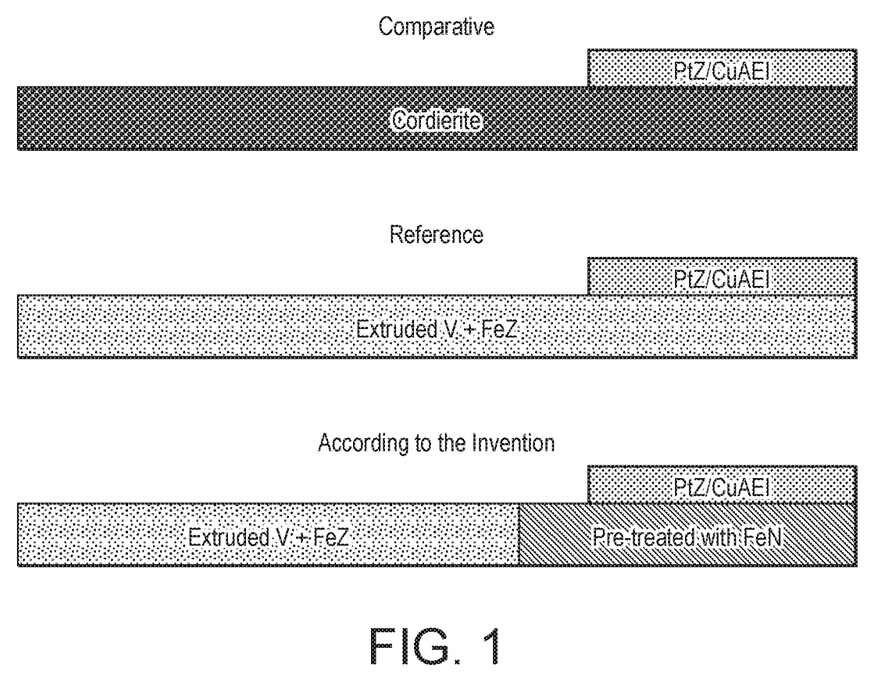
FIG. 1 shows a schematic cross-section of a three test sample arrangements, each coated with a single layer ASC comprising Pt supported on a zeolite mixed with a Cu/AEI SCR catalyst composition. A first arrangement is of a cordierite substrate (comparative). A second arrangement is of an extruded flow-through catalytically active honeycomb substrate formed from a mixture containing an extruded mixture of $V_2O_5/WO_3/TiO_2$ and Fe-ZSM5 (MFI) zeolite described in WO 2014/027207A1. A third arrangement illustrated is the same as the second, except in that a zone of the substrate has been impregnated with iron nitrate and then dried and calcined before the PtZ/CuAEI coating was applied.

Referring to FIG. 1, in use, exhaust gas contacts the SCR material in the substrate in the presence of ammonia and enters the channels of the substrate from the left-hand side, flowing to the right-hand side. This converts the $NO_x$ in the exhaust gas into nitrogen and water.

Excess ammonia in the exhaust gas then contacts the ASC in the first layer and is converted into nitrogen. This conversion can also produce addition $NO_x$ which then contacts the SCR in the first layer and is converted back into nitrogen.

In a preferred embodiment, the flow-through substrate is an extruded blend of vanadium/tungsten/titania and an iron-promoted ZSM-5 zeolite. This is provided with a first layer applied as a washcoat containing about 0.15 wt % Pt, an iron-promoted zeolite and less than 10 wt % of a silica sol binder. The binder helps to make the layer adhere to the substrate but is preferably present in a minimal amount to avoid an increase in back pressure. The first layer may be dried after application and then calcined in air at about 500° C. to fix it.

The completed article is then canned for installation in an exhaust system.

The present disclosure will now be described in relation to the following non-limiting examples.

EXAMPLES

Example 1

Preparation of Extruded Honeycomb Substrate

An extruded honeycomb substrate catalyst according to WO 2014/027207 A1 was prepared by firstly mixing a MFI aluminosilicate zeolite that has been ion-exchanged with >1 wt. % iron with 2 wt. % $V_2O_5$—$WO_3/TiO_2$ balance components with inorganic auxiliaries to improve rheology for extrusion and increase mechanical strength of the extrudate. Suitable organic auxiliaries such as extrusion lubricants and plasticisers can be added to facilitate mixing to form an homogeneous extrudable mass. The organic auxiliaries may include cellulose, water soluble resins such as polyethylene glycol and are burnt out from the final substrate during calcination. The appropriate proportions of the zeolite, $V_2O_5$—$WO_3/TiO_2$, inorganic auxiliaries were selected so that—following removal of the organic auxiliaries—the substrate comprised 16 wt. % of the Fe/zeolite component, 72 wt. % of the $V_2O_5$—$WO_3/TiO_2$ component, 12 wt. % of the inorganic auxiliaries. The extrudable mass was extruded to form 10.5 inch diameter×6.0 inch long and 400 cells per square inch honeycomb bodies in the flow-through configuration (i.e. cells open at both ends) having honeycomb cell wall thicknesses of 11 thousandths of an inch (mil). The extruded honeycomb substrate is then dried and calcined to form the finished product.

Example 2

Preparation of Ion-Exchanged Copper AEI Zeolite SCR Catalyst Washcoat

Commercially available synthetic aluminosilicate zeolite CHA was $NH_4^+$ ion exchanged in a solution of $NH_4NO_3$, then filtered. The resulting materials were added to an aqueous solution of $Cu(NO_3)_2$ with stirring. The slurry was filtered, then washed and dried. The procedure can be repeated to achieve a 3 wt % metal loading. The final product was calcined.

Example 3

Preparation of Pt Zeolite Ammonia Slip Catalyst Washcoat Component

A solution of platinum nitrate was impregnated onto a commercially available zeolite to form a slurry in which the target Pt content of the zeolite was 0.2 wt. % and a Pt nominal loading of 3 g/ft³.

Example 4

Preparation of Pt Zeolite/CuAEI Ammonia Slip Catalyst Washcoat

A washcoat slurry comprising a 50:50 blend by weight of the CuAEI SCR catalyst of Example 2 and a Pt zeolite ASC washcoat component of Example 3 was prepared in water with the of an alumina sol binder.

Example 5

Coating of Substrates with First Layer Catalyst Compositions

One honeycomb substrate prepared according to Example 1 was coated from one end of the honeycomb substrate with a washcoat of Example 4 (Comparative) using the process described in WO 99/47260 A1 to a depth of 1 inch, i.e. a method comprising the steps of (a) locating a containment means on top of the substrate, (b) dosing a pre-determined quantity of a liquid component into said containment means, either in the order (a) then (b) or (b) then (a), and (c) by applying vacuum, drawing the entirety of said quantity of liquid component into at least a portion of the substrate, and retaining substantially all of said quantity within the support, without recycle. The coated substrate was then dried and calcined.

Separately, a honeycomb substrate prepared according to Example 1 was impregnated from one end to target a depth of about 1.5 inches of the honeycomb substrate with an iron nitrate solution to a target loading of 1000 gft$^{-3}$. The part was then dried and calcined in air. The resulting iron nitrate impregnated part was then coated with the ammonia slip catalyst washcoat of Example 4 in the same way as described in this Example 5 hereinabove from the end from which the iron nitrate impregnation had been applied. The thus coated part was again dried and calcined to result in a coated product according to the invention.

A comparison product was prepared in a similar way by using a cordierite honeycomb substrate (Comparative).

Example 6

Ageing Conditions

Samples of the extruded catalyst honeycomb substrates resulting from Example 5 were aged thermally (no water present) in an accelerated ageing step either by heating them in an oven at above 580° C. for 2 hours (referred to herein as "fresh") or at 580° C. for 50 hours (referred to herein as "aged") at a flow rate of 10,000 kg gas/hr to simulate the expected exposure of the honeycomb substrates to automotive vehicular exhaust gases over a vehicle end-of-life, according to European emission standard legislation.

Example 7

Figure 2:
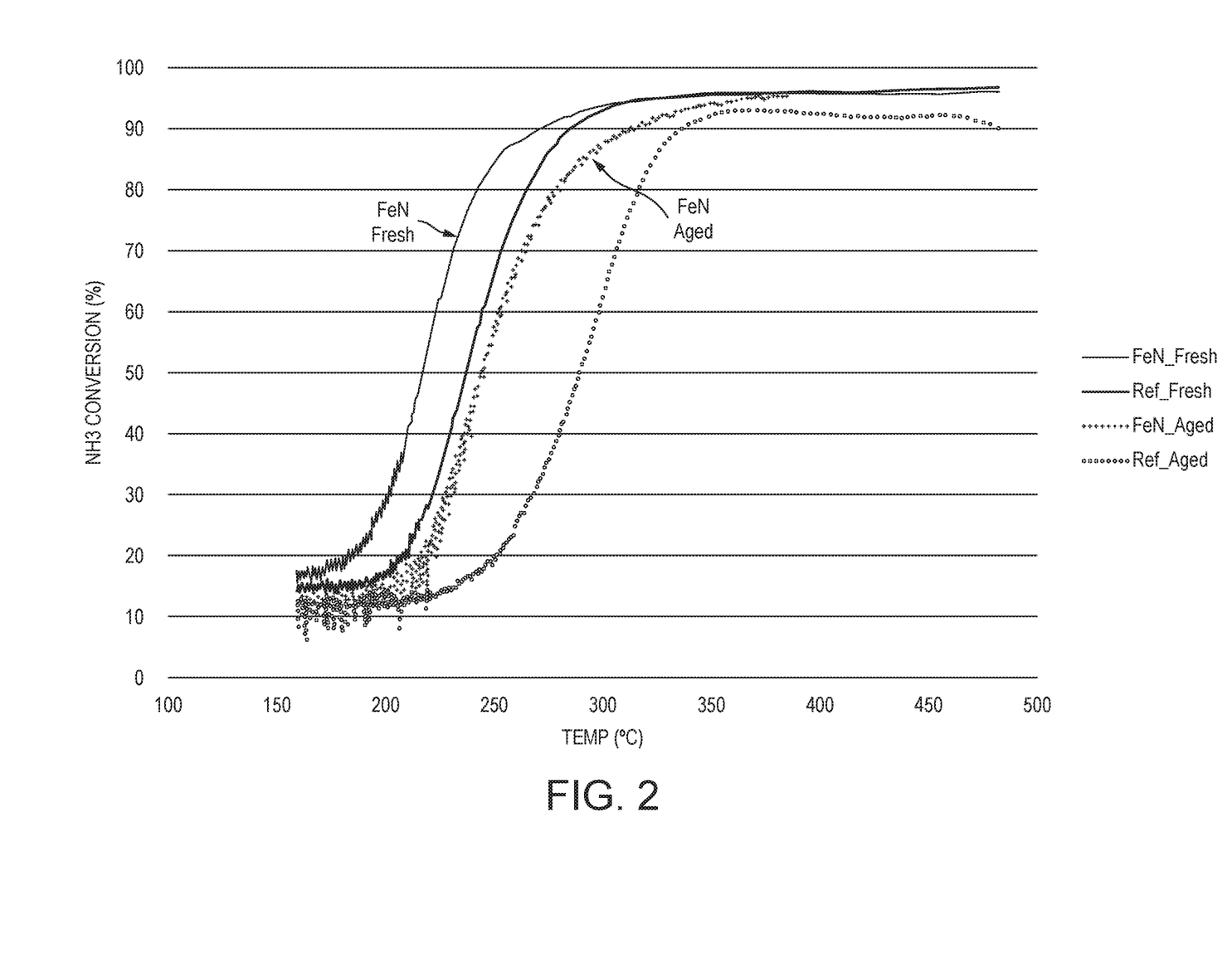
FIG. 2 shows a graph comparing $NH_3$ oxidation activity of the 1 inch×1 inch cores for the fresh and aged extruded catalysts (reference and according to the invention)

Testing Conditions 1 inch diameter cores were cut from the fresh and aged substrates from Example 6 and were each loaded into a synthetic catalytic activity test (SCAT) laboratory apparatus to test each sample's ability to oxidize $NH_3$ in a simulated exhaust gas containing 500 ppm $NH_3$, 4.5 wt. % CO, 5 wt. % $H_2O$, 200 ppm $CO_2$, 12 wt. % $O_2$, and the balance $N_2$. The test was conducted at an exhaust gas space velocity of 150,000 hr$^{-1}$. The results for % $NH_3$ conversion vs. temperature is shown in FIG. 2. The coated ammonia slip catalyst section of each core was then cut free from the remainder of the core to provide a 1 inch×1 inch core. The 1 inch×1 inch cores were tested in a SCAT apparatus for ammonia conversion.

Figure 3:
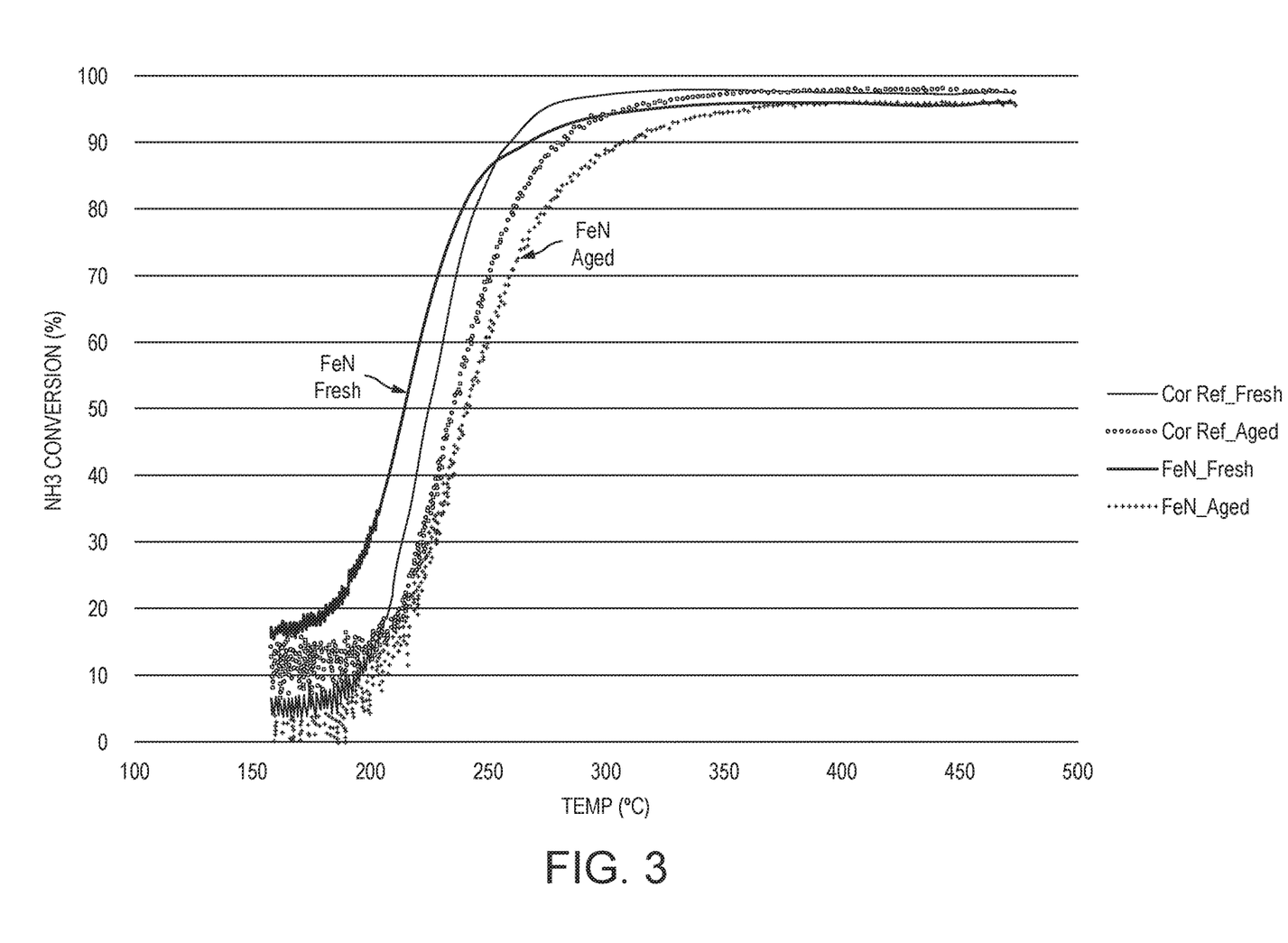
FIG. 3 shows a graph comparing $NH_3$ oxidation activity of the 1 inch×1 inch cores of fresh and aged extruded catalysts (according to the invention and cordierite comparative Example)

As shown in FIG. 2, pre-treating the extruded catalyst with iron nitrate has improved fresh and aged $NH_3$ oxidation performance compared with the equivalent arrangement but without the iron nitrate impregnation ("Ref" in the Figures). FIG. 3 shows that the ammonia oxidation activity of the catalyst according to the invention is better when fresh than the cordierite comparative example, and almost the same when aged. This shows that the ammonia oxidation activity of the aged sample according to the invention is less affected by vanadium poisoning derived from the extruded substrate.

Figure 4:
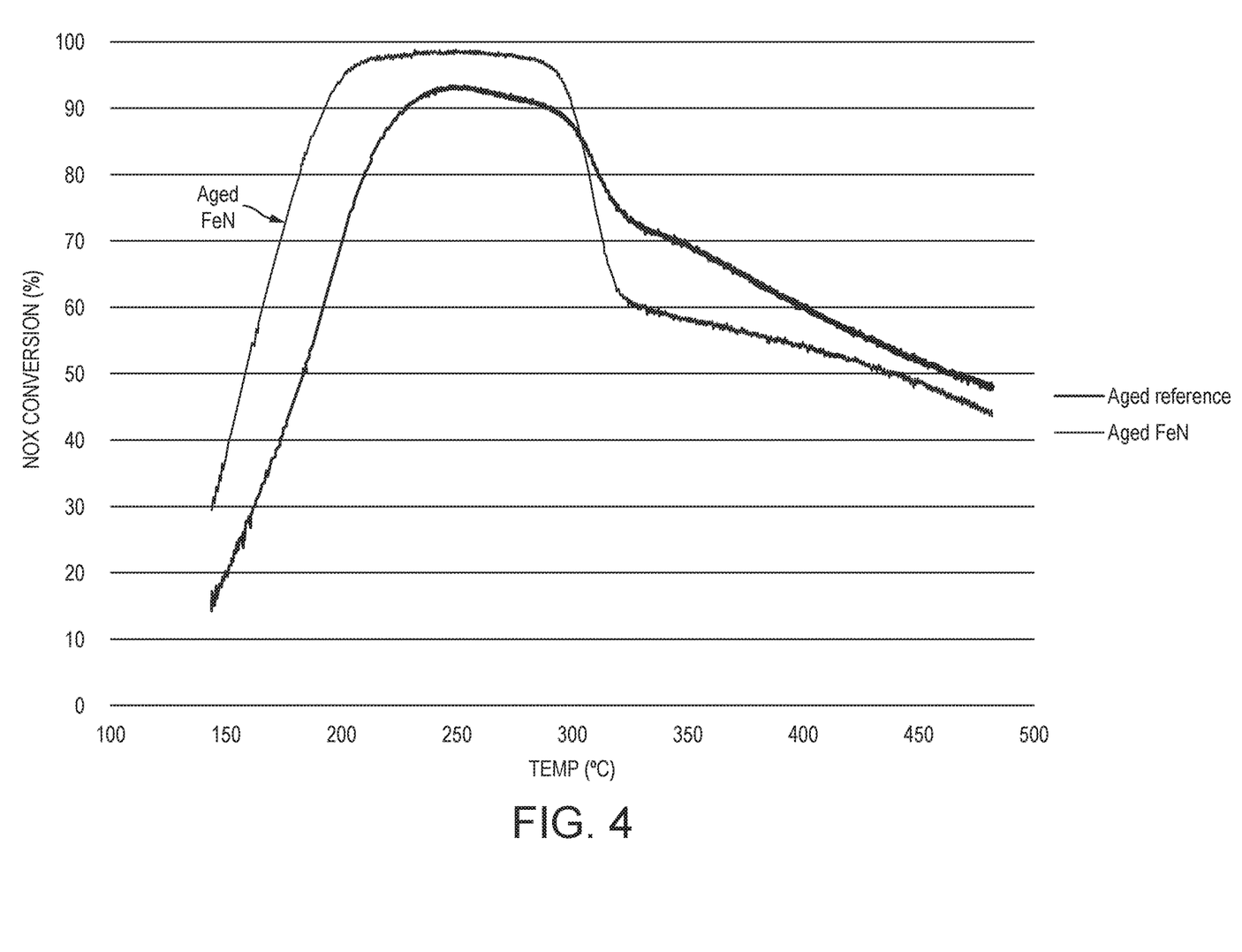
FIG. 4 shows a graph comparing NOx conversion activity, i.e. the SCR reaction, for the full 6 inch cores of the extruded catalysts.
Figure 5:
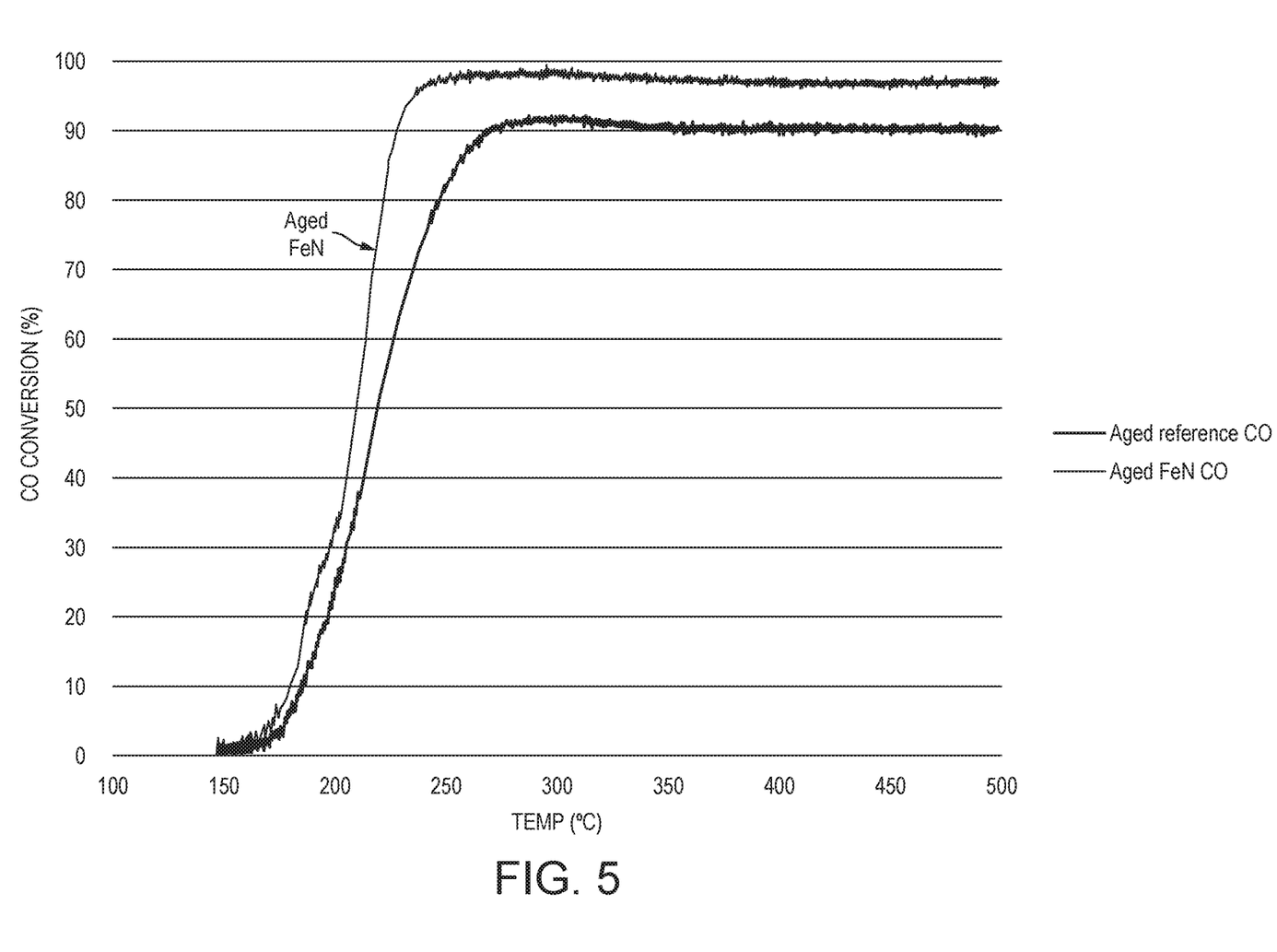
FIG. 5 shows a graph comparing the activity of the catalyst as a whole to oxidise carbon monoxide (CO) for the full 6 inch cores of the extruded catalysts.

FIG. 4 shows that the SCR layer of the aged reference Example appears to have been affected by vanadium poisoning, or possibly tungsten poisoning or both. Similarly, the CO oxidation activity of the full 6 inch cores is poorer for the aged reference Example than that of the core according to the invention, indicating that the activity of the Pt zeolite has been affected by vanadium and/or tungsten from the extruded SCR catalyst in the substrate.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

For the avoidance of doubt, the entire contents of all documents acknowledged herein are incorporated herein by reference.

The invention claimed is:

1. A catalyst article for treating a flow of a combustion exhaust gas, the article comprising:
    a catalytically active substrate comprising one or more channels extending along an axial length thereof through which, in use, a combustion exhaust gas flows, the one or more channels having a first surface for contacting a flow of combustion exhaust gas;
    wherein the substrate is formed of an extruded vanadium-containing SCR catalyst material,
    wherein a first layer is disposed on at least a portion of the first surface, wherein the first layer comprises a washcoat of an ammonia slip catalyst composition comprising one or more platinum group metals supported on a particulate metal oxide support material, and
    wherein a layer comprising a washcoat of SCR catalyst composition is disposed on a surface in the one or more channels, wherein the SCR catalyst composition comprises a copper-promoted zeolite, an iron-promoted zeolite or a combination thereof,
    wherein at least the portion of the first surface on which the first layer is disposed comprises a compound of copper, iron, cerium, zirconium, or a mixture of any two or more thereof.

2. The catalyst article according to claim 1, wherein the compound is an iron compound.

3. The catalyst article according to claim 1, wherein the layer comprising the washcoat of SCR catalyst composition is the first layer disposed on at least a portion of the first surface and the first layer is a mixture of the SCR catalyst composition and ammonia slip catalyst composition.

4. The catalyst article according to claim 1, wherein the layer comprising the washcoat of SCR catalyst composition is a second layer, which is disposed on at least a portion of the first layer.

5. The catalyst article according to claim 4, wherein the second layer has an ammonia storage capacity of up to 0.1 g per g of the second layer when measured at 200° C.

6. The catalyst article according to claim 1, wherein the substrate is a honeycomb flow-through monolith substrate.

7. The catalyst article according to claim 1, wherein the particulate metal oxide support material is selected from the group consisting of alumina, a silica-titania mixed oxide, a Ce—Zr mixed oxide, ceria, titania, silica, zirconia, zeolite, or mixtures of any two or more thereof.

8. The catalyst article according to claim 1, wherein the substrate comprises from 1 to 3 wt %, preferably 1.5 to 2.5 wt %, vanadium oxide.

9. The catalyst article according to claim 1, wherein the first layer comprises from 0.05 to 0.5 wt % of the platinum group metal.

10. The catalyst article according to claim 1, wherein the platinum group metal is Pt or a combination of Pt and Pd.

11. The catalyst article according to claim 1, wherein the first layer covers up to 50% of the axial length of the substrate, preferably from 10 to 40% of the axial length and preferably extends from an end of the article.

12. The catalyst article according to claim 1, wherein the layer comprising the washcoat of SCR catalyst composition is a second layer, which is disposed on at least a portion of the first layer, and wherein the first layer covers up to 50% of the axial length of the substrate, preferably from 10 to 40% of the axial length and preferably extends from an end of the article; and wherein the second layer covers at least 50% of the axial length of the substrate, preferably 100% of the axial length.

13. The catalyst article according to claim 1, wherein the first layer covers at least 50% of the axial length of the substrate, preferably 100% of the axial length.

14. The catalyst article according to claim 1, wherein the SCR catalyst is a copper- or iron-promoted small pore zeolite having the framework type AEI, AFX, CHA, DDR, ERI, ITE, LEV, LTA, STI or SFW.

15. The catalyst article according to claim 1, wherein the layer comprising the washcoat of SCR catalyst composition is a second layer, which is disposed on at least a portion of the first layer wherein the second layer covers 100% of the first layer by area.

16. An emission treatment system for treating a flow of a combustion exhaust gas, the system comprising a source of combustion exhaust gas in fluid communication with the catalyst article according to claim 1, and a source of nitrogenous reductant arranged upstream of said article.

17. The emission treatment system according to claim 16, wherein the first layer covers up to 50% of the axial length of the substrate and is provided extending from a downstream end of the article.

18. The emission treatment system according to claim 16, wherein the source of combustion exhaust gas is a diesel engine.

19. A method for treating a flow of a combustion exhaust gas, the method comprising:
contacting a flow of combustion exhaust gas with the catalyst article according to claim 1 in the presence of a nitrogenous reductant.

20. A method of making a catalyst article according to claim 1, which method comprising impregnating a first surface of one or more channels of a catalytically active substrate formed of an extruded vanadium-containing SCR catalyst material on which a first layer comprising a washcoat of an ammonia slip catalyst composition comprising one or more platinum group metals supported on a particulate metal oxide support material is to be disposed with an aqueous salt solution of copper, iron, cerium, magnesium or zirconium or a mixture of any two or more thereof, drying the impregnated substrate and applying a washcoat of an ammonia slip catalyst composition comprising one or more platinum group metals supported on a particulate metal oxide support material on the first surface.

21. A method of making a catalyst article according to claim 1, which method comprising forming an extrudeable paste comprising a vanadium-containing SCR catalyst material, a permanent binder and a compound of copper, iron, cerium, magnesium or zirconium or a mixture of any two or more thereof, extruding the paste into a honeycomb form comprising one or more channels extending along an axial length thereof through which, in use, a combustion exhaust gas flows, the one or more channels having a first surface for contacting a flow of combustion exhaust gas, drying and calcining the extruded honeycomb form paste and applying a washcoat of an ammonia slip catalyst composition.

* * * * *